(12) United States Patent
Ando

(10) Patent No.: US 6,957,370 B2
(45) Date of Patent: Oct. 18, 2005

(54) DIGITAL SIGNAL PROCESSOR INCLUDING AN INTERFACE THEREIN CAPABLE OF ALLOWING DIRECT ACCESS TO REGISTERS FROM AN EXTERNAL DEVICE

(75) Inventor: Tomoaki Ando, Hamamatsu (JP)

(73) Assignee: Yamaha Corporation, Shizuoka-ken (JP)

( * ) Notice: Subject to any disclaimer, the term of this patent is extended or adjusted under 35 U.S.C. 154(b) by 332 days.

(21) Appl. No.: 09/799,506

(22) Filed: Mar. 7, 2001

(65) Prior Publication Data

US 2004/0221212 A1 Nov. 4, 2004

(30) Foreign Application Priority Data

Mar. 10, 2000 (JP) .......................... P.2000-066536

(51) Int. Cl.[7] .......................... G01R 31/28; G06F 11/00
(52) U.S. Cl. .......................... 714/724; 714/30
(58) Field of Search .................. 714/724, 30; 710/10

(56) References Cited

U.S. PATENT DOCUMENTS

| | | | | |
|---|---|---|---|---|
| 5,032,986 A | * | 7/1991 | Pathak et al. | 711/217 |
| 5,524,265 A | * | 6/1996 | Balmer et al. | 712/38 |
| 5,544,107 A | * | 8/1996 | Hill | 365/201 |
| 5,586,306 A | * | 12/1996 | Romano et al. | 711/112 |
| 5,651,127 A | * | 7/1997 | Gove et al. | 711/202 |
| 5,710,934 A | * | 1/1998 | Bona et al. | 714/724 |
| 5,828,674 A | * | 10/1998 | Proskauer | 714/724 |
| 5,983,017 A | * | 11/1999 | Kemp et al. | 717/129 |
| 6,012,136 A | * | 1/2000 | Brown | 712/35 |
| 6,058,117 A | * | 5/2000 | Ennamorato et al. | 370/442 |
| 6,170,048 B1 | * | 1/2001 | Wing So | 712/35 |
| 6,170,071 B1 | * | 1/2001 | Wheeler | 714/724 |
| 6,185,629 B1 | * | 2/2001 | Simpson et al. | 710/10 |
| 6,205,223 B1 | * | 3/2001 | Rao et al. | 380/42 |
| 6,414,858 B1 | * | 7/2002 | Giannopoulos | 363/41 |
| 6,425,102 B1 | * | 7/2002 | Matsushita | 714/733 |
| 6,522,985 B1 | * | 2/2003 | Swoboda et al. | 702/117 |

* cited by examiner

*Primary Examiner*—Albert Decady
*Assistant Examiner*—Esaw Abraham
(74) *Attorney, Agent, or Firm*—Reed Smith LLP; Stanley P. Fisher, Esq.; Juan Carlos A. Marquez, Esq.

(57) ABSTRACT

A DSP comprises pipeline registers, a logical operation circuit, a product-sum circuit, DSP registers and an interface. The DSP registers includes at least a plurality of program control registers and excludes the pipeline registers, the logical operation circuit, the product-sum circuit. The interface is connected to the DSP registers, and causes an external device to be capable of writing and reading out from the DSP registers.

15 Claims, 6 Drawing Sheets

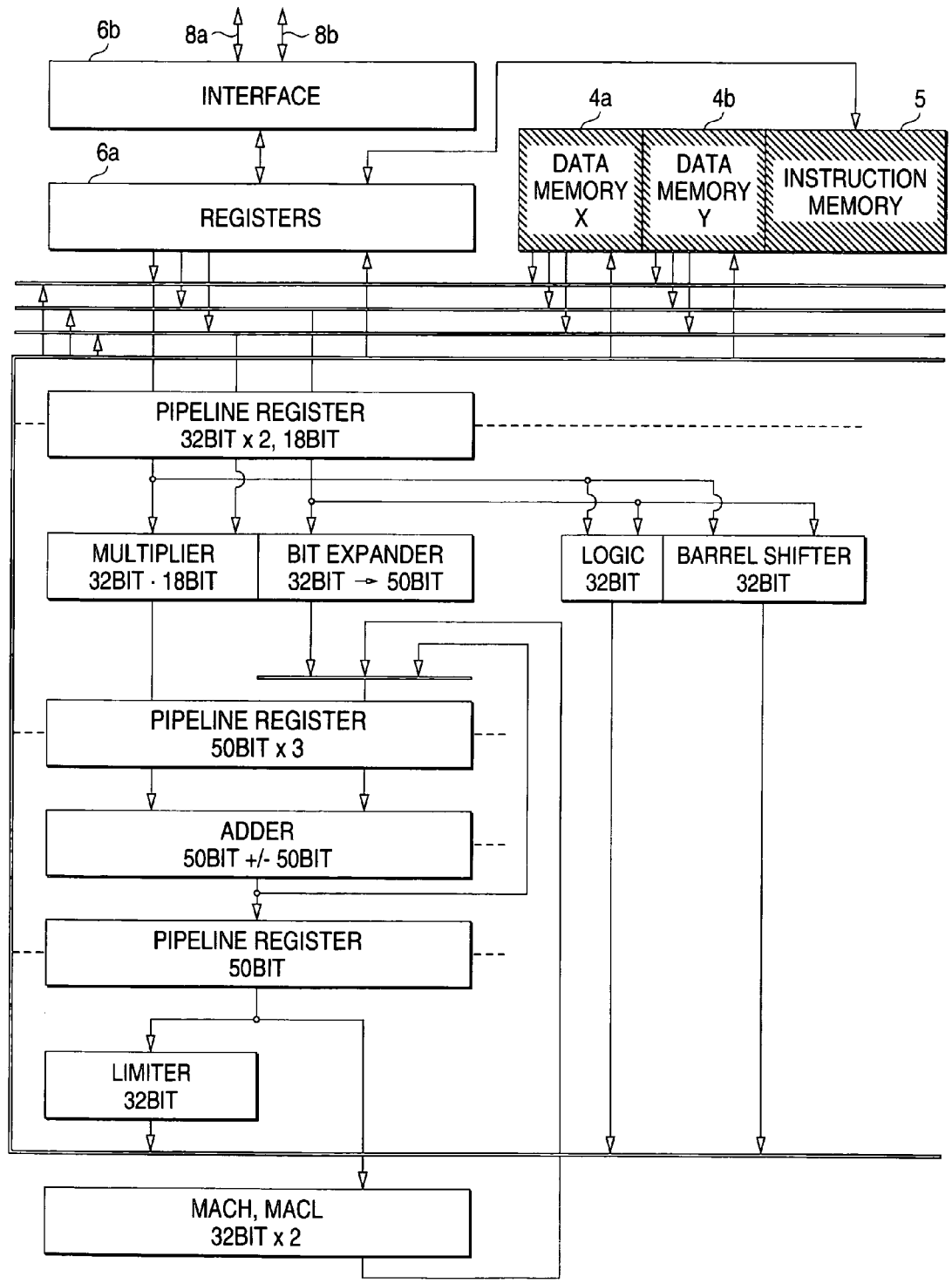

FIG. 5

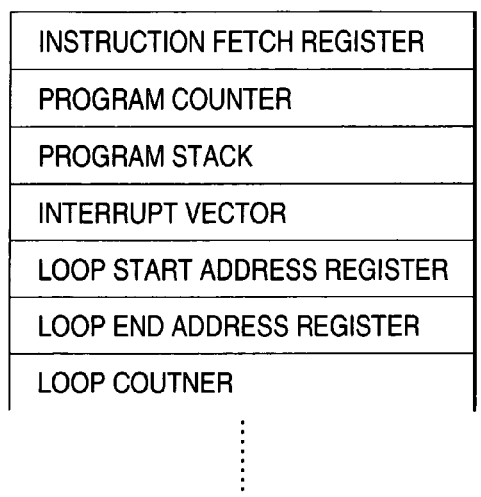

| INSTRUCTION FETCH REGISTER |
| PROGRAM COUNTER |
| PROGRAM STACK |
| INTERRUPT VECTOR |
| LOOP START ADDRESS REGISTER |
| LOOP END ADDRESS REGISTER |
| LOOP COUTNER |

| TERMINAL NAME | INPUT/OUTPUT | DESCRIPTION |
|---|---|---|
| i_Host_read | INPUT | HOST READ REQUEST<br>A HOST REQUEST FOR READING OUT DATA AT ADDRESS DESIGNATED BY HOST ADDRESS |
| i_Host_write | INPUT | HOST WRITE REQUEST<br>A HOST REQUEST FOR WRITING DATA AT ADDRESS DESIGNATED BY HOST ADDRESS |
| i_Host_address | INPUT | HOST ADDRESS<br>AN ADDRESS OF DSP REGISTER IS DESIGNATED |
| i_Host_data | INPUT/OUTPUT | HOST DATA<br>DATA WHICH HAS BEEN READ OUT FROM ADDRESS DESIGNATED BY HOST ADDRESS, OR DATA WHICH IS WRITTEN AT DESIGNATED ADDRESS |

FIG. 7

| TERMINAL NAME | INPUT/OUTPUT | DESCRIPTION |
|---|---|---|
| i_clock | INPUT | CLOCK<br>AN INPUT OF EXTERNAL CLOCK |
| i_reset | INPUT | RESET<br>INITIALIZE DSP |
| i_start | INPUT | START REQUEST<br>START THE OPERATION OF DSP |
| i_halt | INPUT | STOP REQUEST<br>STOP THE OPERATION OF DSP |
| i_interrupt | INPUT | INTERRUPT REQUEST<br>REQUEST A START OF INTERRUPT PROCESSING TO DSP |
| o_PC | OUTPUT | PROGRAM COUNTER OUTPUT<br>INDICATE AN ADDRESS OF THE INSTRUCTION BEING EXECUTED BY DSP |
| o_request | OUTPUT | DSP REQUEST<br>DSP MAKES A REQUEST, RESPONSE AND THE LIKE TO THE OUTSIDE |
| o_busy | OUTPUT | BUSY FLAG<br>INDICATE THE OPERATING STATE OF DSP |

DIGITAL SIGNAL PROCESSOR INCLUDING AN INTERFACE THEREIN CAPABLE OF ALLOWING DIRECT ACCESS TO REGISTERS FROM AN EXTERNAL DEVICE

BACKGROUND OF THE INVENTION

1. Field of the Invention

The present invention relates to a digital signal processor (hereafter referred to as the DSP) including a logical operation circuit, a product-sum circuit, and registers.

The present application is based on Japanese Patent Application No. 2000-066536, which is incorporated herein by reference.

2. Description of the Related Art

The DSP includes a logical operation circuit, a product-sum circuit, and registers, adopts the so-called harbored architecture and a structure capable of program control for repetitive operation processing, and is widely used as it is optimal in continuous product-sum operation processing by an FIR filter (i.e., finite impulse response filter) or the like.

FIG. 1 shows a typical example of a related DSP. The DSP is comprised of a product-sum circuit (including pipeline registers, a multiplier, a bit expander, adders, and a limiter) including pipeline registers and adders for effecting pipeline processing of data, a logical operation circuit (including a logic), and registers (registers and product-sum memories MACH and MACL), and data memories (data memories X and Y) and an instruction memory are connected thereto.

For example, as shown in FIG. 2, a host computer 1 sets data necessary for operations in the aforementioned data memories (data memories X and Y) 4a and 4b through a PCI bus interface 2 and a local bus interface 3, causes a DSP 6 to perform operations, and obtains their results through the memories 4a and 4b.

A program necessary for DSP operations is set in an instruction memory 5. The DSP 6 advances the program step of the instruction memory by a program counter in the internal registers.

However, in control using the above-described DSP, the host computer 1 basically merely inputs data necessary for operations to the DSP and sends control signals for starting or stopping the operation, while the DSP merely delivers the results of operation by handshaking with respect to those signals, and the DSP itself is merely designed to specifications for performing stand-alone operations. Accordingly, the host computer, when performing the DSP operation, is able to obtain only the results of operation by the DSP operation, and is unable to execute detailed processing routines which are not predetermined routine operations, so that there has been a drawback in that the scope of application is limited.

In addition, since it is impossible to directly access the internal registers, it has been necessary to separately provide a test circuit for the registers inside the DSP.

SUMMARY OF THE INVENTION

Accordingly, an object of the present invention is to enhance control functions from outside the DSP.

To overcome the above-described problems and achieve the above object, according to a first aspect of the present invention, there is provided a digital signal processor which comprises a logical operation circuit, a product-sum circuit, a plurality of registers, and an interface capable of allowing access to the registers from an external device.

In the first aspect of the present invention, the logical operation circuit and the product-sum circuit may be circuits, which are to be used in an ordinary DSP, and for example, which are to be located below the pipeline register, 32bitX2, 18bit, in FIG. 1. The registers refer to those other than the same. In the present invention, there is provided an interface capable of allowing direct access to the registers in the DSP from a host computer side. The interface capable of allowing direct access, means that reading-out and writing are possible with respect to the registers from an external device at arbitrary timings. Accordingly, the following things become possible.

(a) Since direct access to the registers from an external device, i.e., a host computer side, is possible, the program sequence of the DSP can be controlled from the host computer.

(b) Even if a test circuit is not provided in the DSP, it is possible to test the registers from the external host computer or tester. For this reason, the testability of the DSP is high.

(c) It is possible to execute not only predetermined arithmetic routines of the DSP but also detailed processing routines.

(d) It is possible to interconnect DSPs.

Further, according to a second aspect of the present invention, the registers may be program control registers including at least a program counter and an interrupt vector.

In the second aspect of the present invention, at least registers that can be directly accessed, are the aforementioned program control registers. Accordingly, it is impossible to access the pipeline registers, general purpose registers, product-sum registers, and the like. Since these registers are used for arithmetic operations, it can be said that the need for accessing them from the host computer is not so large.

Taking the above into consideration, according to a third aspect of the present invention, the interface is directly connected to the registers, and causes an external device to be capable of writing and reading out from the registers, so that direct access to the registers from the external device is established through the interface.

Further, according to a fourth aspect of the present invention, the interface is connected to one of control registers provided in a local bus interface and a local bus.

Further, according to a fifth aspect of the present invention, the program control registers may include both of the program counter and the interrupt vector.

Furthermore, according to a sixth aspect of the present invention, the registers can be tested by an external device without provision of a test circuit in the DSP discussed above.

BRIEF DESCRIPTION OF THE DRAWINGS

FIG. 4 is a diagram of the DSP of the embodiment according to the present invention;

FIG. 5 is a diagram illustrating registers;

FIG. 6 is a diagram listing names of host interface terminals;

FIG. 7 is a diagram listing names of a system interface; and

DETAILED DESCRIPTION OF THE PREFERRED EMBODIMENT

Figure 1:
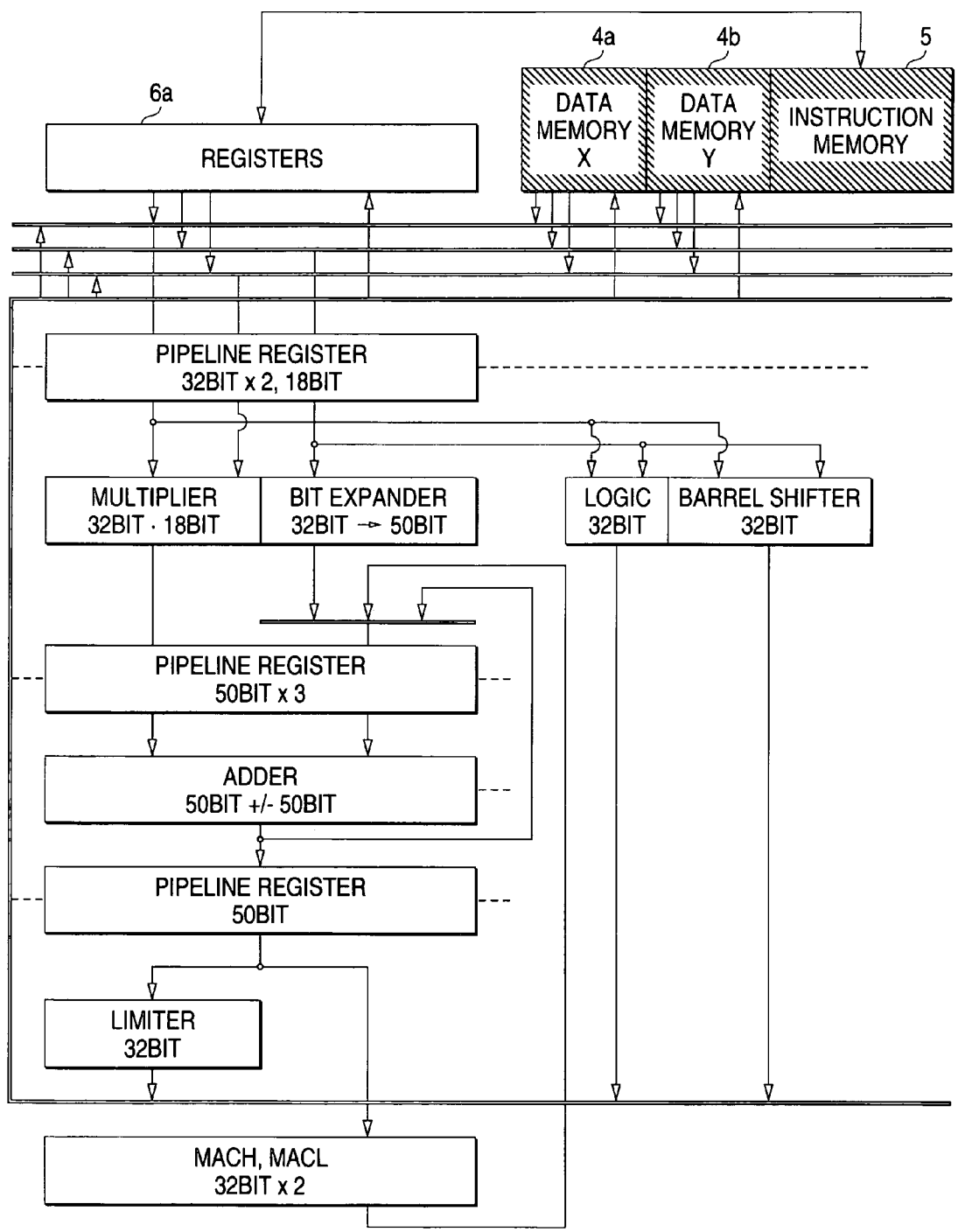
FIG. 1 is a schematic diagram of a related DSP.
Figure 2:
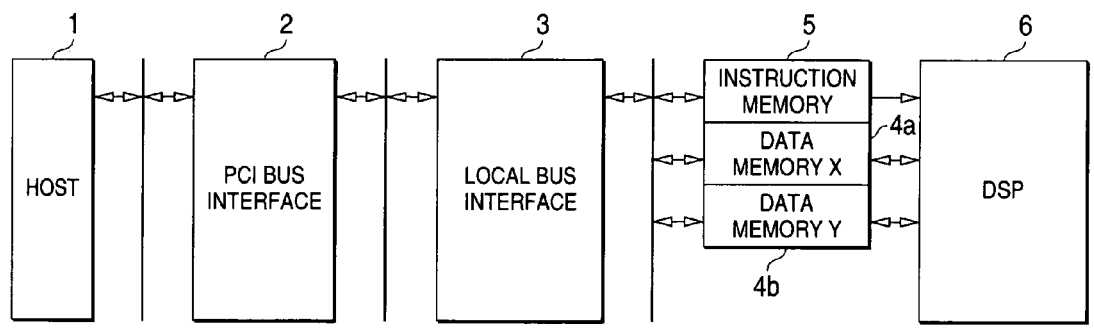
FIG. 2 is a diagram of a system using the related DSP.
Figure 3:
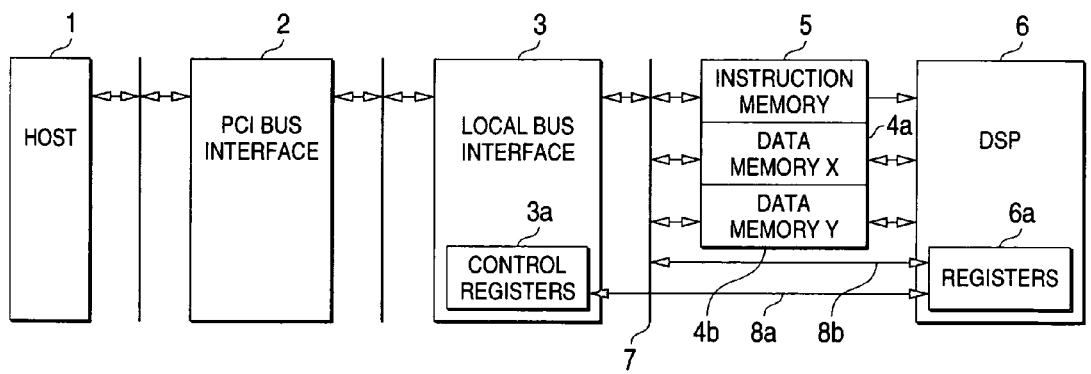
FIG. 3 is a diagram of a system using a DSP of a preferred embodiment according to the present invention.

FIG. 3 shows a system configuration using the DSP in accordance with an embodiment of the present invention. A host computer 1 sets data necessary for operations in the aforementioned data memories (data memories X and Y) 4a and 4b through a PCI bus interface 2 and a local bus interface 3, causes a DSP 6 to perform operations, and obtains their results through the memories 4a and 4b. A program necessary for DSP operations is set in an instruction memory 5. The DSP 6 advances the program step of the instruction memory by a program counter in the internal registers.

When the DSP 6 is made to perform, for example, a filtering operation, a coefficient (a coefficient address in a case where a coefficient table is present in the DSP) and data are input to the DSP 6 from the host computer 1 to send an operation-start control signal (operation start signal). At the time of completion of the filtering operation, an operation-end control signal (operation stop signal) is sent to the DSP 6 from the host computer 1. Further, a reset signal for initializing the DSP 1 and an interrupt request signal are also sent.

The PCI bus interface 2 serves as an interface with a PCI bus to which the host computer 1 is connected, while the local bus interface 3 serves as an interface between the PCI bus and the DSP 6. In the DSP 6 in this embodiment, registers 6a inside the DSP (hereafter, the DSP registers 6a) and the local bus interface 3 are directly connected through an interface inside the DSP and a line 8b. It should be noted that a line 8a does not show that the registers are directly connected, but shows that control registers 3a of the local bus interface 3 are mapped at addresses of data memories 4. Accordingly, it is possible for the host computer 1 to directly access the DSP registers 6a.

The DSP registers 6a in this embodiment are formed by program control registers including a program counter and an interrupt vector. Although other registers may be included, pipeline registers used in DSP operations are not included.

FIG. 4 is a schematic diagram of the DSP.

In this DSP 6, an interface 6b is connected to the DSP registers 6a. Referring also to FIG. 3, the interface 6b is connected through the lines 8a and 8b to the control registers 3a in the local bus interface 3 or to a local bus 7. As shown in FIG. 5, the DSP registers 6a include at least program control registers including an instruction fetch register, a program counter, a program stack, an interrupt vector, a loop start address register, a loop end address register, and a loop counter. In this embodiment, although general purpose registers and index registers for the data memories 4a and 4b are additionally included, these registers need not necessarily be made accessible.

FIG. 6 is a terminal diagram of the above-described interface 6b. Terminals in the drawing are referred to as host interface terminals. A method of accessing the registers using these terminals is as follows.

Access (Reading Out) from the Host Computer to the DSP Registers

An address of a DSP register to which read access is to be made is set for a host address terminal (i_Host_address), and a host read request is sent to a host read terminal (i_Host_read). At this time, data on the aforementioned DSP register is read and carried on a host input/output terminal (i_Host_data).

Access (Writing) from the Host Computer to the DSP Registers

An address of a DSP register to which write access is to be made is set for the host address terminal (i_Host_address), and a host write request is sent to a host write terminal (i_Host_write). At this time, data is carried on the host input/output terminal (i_Host_data), and this data is written in the aforementioned DSP register.

By providing the above-described configuration, by changing on the host computer side an initial value of a loop start address register or an initial value of the program counter, the contents of operation in the DSP 6 can be changed. In addition, it is possible to set an initial address of certain processing in the program counter, and then to issue a start request to the DSP. This means that only a part of the DSP program becomes usable on the host computer 1 side. By using this function, the DSP 6 can be used not only as a stand-alone, but also as a coprocessor for the host computer. Thus, as the host computer 1 accesses the program control registers in the DSP registers 6a and effects reading out and writing, and the program sequence of the DSP 6 can be simply controlled by the host computer 1, thereby making it possible to render the form of usage of the DSP very wide.

In addition, as a test is connected to the DSP registers, it is possible to effect reading out and writing by directly accessing the registers from the tester, so that testing of the internal registers of the DSP can be performed easily. Accordingly, a special test circuit is not required in the DSP. As a result, testability improves easily.

FIG. 7 shows a diagram of ordinary DSP terminals (system interface terminals). As shown in the drawing, since the ordinary DSP terminals have only those terminals to which requests such as a start request (i_start), a stop request (i_halt), an interrupt request (i_interrupt), and the like are issued from the host computer side, only the starting and stopping of predetermined arithmetic programs of the DSP can be effected.

Figure 8:
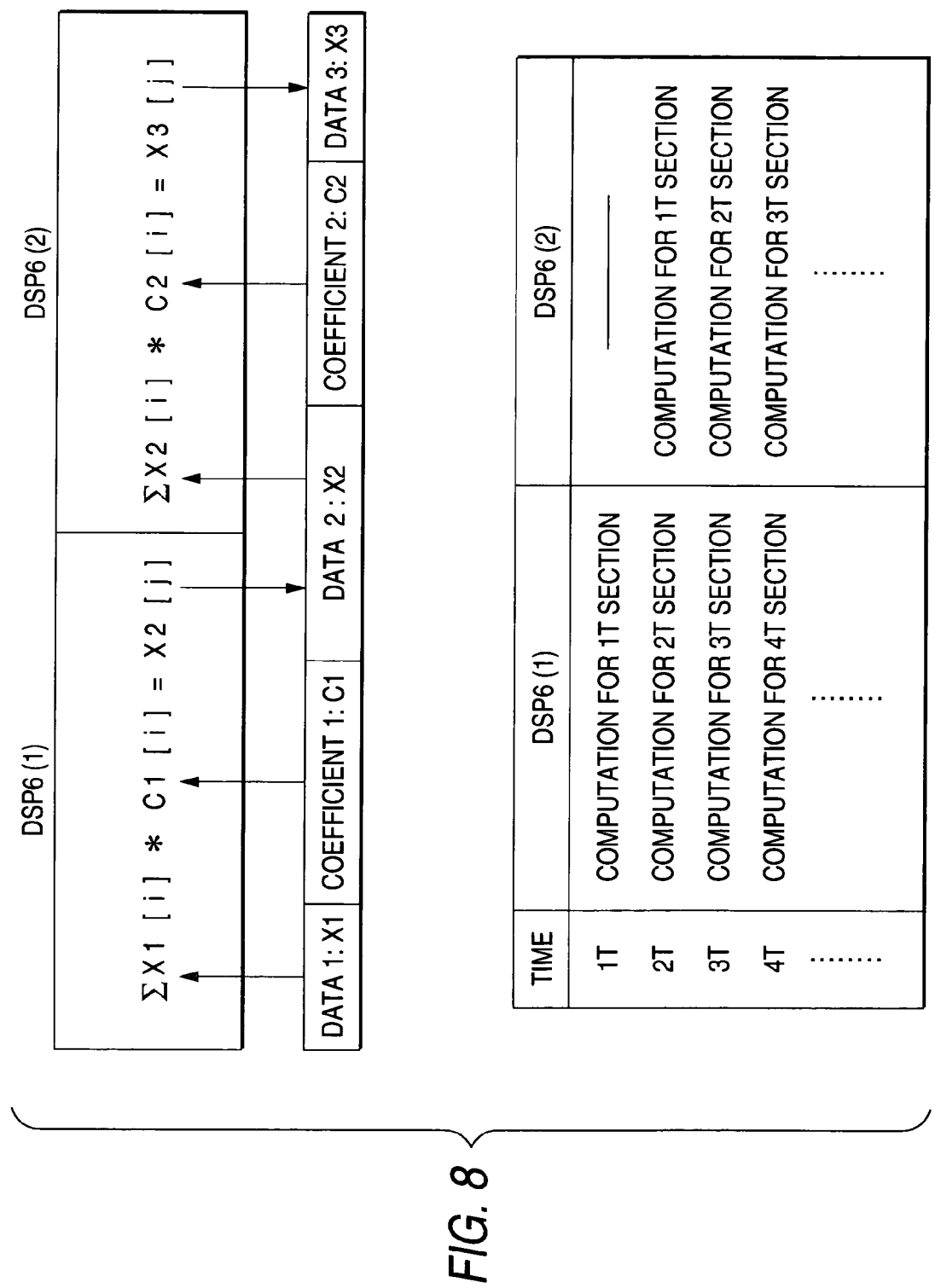
FIG. 8 is a diagram of interconnection of DSPs and a computation sequence diagram.

In accordance with the configuration of the DSP in this embodiment, an interconnection between DSPs is possible, and one DSP can be provided with a host function. FIG. 8 shows an example in which two DSPs 6(1) and 6(2) are interconnected to form an FIR filter computing unit. In this example, a result of FIR filter computation by the DSP 6(1) using data 1 and a coefficient 1 is further subjected to FIR filter computation by the DSP 6(2) using a coefficient 2. In addition, one DSP 6(1) is provided with a host function. It should be noted that times 1T, 2T, 3T, . . . , denote sampling times, and each DSP effects a convolution operation (product-sum operation) within each sampling section.

An outline of the procedures of the DSP 6(1) are as follows.

Procedure 1: execution of the computation of a T section by the DSP 6(1)

Procedure 2: confirmation of the completion of computation by the DSP 6(2)

Procedure 3: copying of the result of computation by the DSP 6(1) to data 2

Procedure 4: writing of necessary control information in the registers of the DSP 6(2)

Procedure 5: issuance of an operation start request to the DSP 6(2)

Procedure 6: return to procedure 1

In the above-described procedures, the operation of procedure 4 provides access to the registers of the DSP 6(2).

By interconnecting the DSPs 6 in the above-described manner, it is possible to allow product-sum operations of the DSPs to be effected in parallel and to provide one DSP 6 with a host function.

In accordance with the present invention, the following advantages are obtained.

Since it is possible for the host computer side to directly access the registers, it is possible to control the program sequence of the DSP from the host computer. For example, it is possible to change an initial value of a loop program of the DSP program or change a value of the program counter so as to issue an operation start signal. In addition, this function makes it possible to interconnect the DSPs and to use one DSP as the host.

Even if a test circuit is not provided in the DSP, it is possible to test the internal registers of the DSP from an external device. For this reason, the testability of the DSP becomes high.

What is claimed is:

1. A digital signal processor which operation on digital signals is controlled by an external device via an instruction memory and a data memory of the external device, comprising:
   a logical operation circuit;
   a product-sum circuit;
   a plurality of program control registers including at least one of program counter and an interrupt vector; and
   an interface for providing access to the registers by the external device to read out data from or write in data to the registers,
   wherein the interface is directly connected to the registers.

2. The digital signal processor of claim 1, wherein the interface is connected to one of control registers provided in a local bus interface and a local bus.

3. The digital signal processor of claim 1, wherein the program control registers include both of the program counter and the interrupt vector.

4. The digital signal processor of claim 1, wherein the registers are tested by an external device without provision of a test circuit in the digital signal processor.

5. The digital signal processor of claim 1, wherein the external device is a CPU of a host computer.

6. The digital signal processor of claim 1, wherein the external device is a tester for testing the registers.

7. The digital signal processor of claim 1, wherein the external device controls a program sequence of the digital signal processor by accessing the program sequence stored in one of the registers.

8. The digital signal processor of claim 1, wherein the external device designates a processing routine to the digital signal processor by accessing one of the registers.

9. The digital signal processor of claim 1, wherein the external device an initial value of the program counter to change an operation in the digital signal processor.

10. A digital signal processor comprising:
    a logical operation circuit;
    a product-sum circuit;
    a register;
    a program control register including a program counter, an interrupt vector, a loop start address register and loop end address register; and
    an interface unit which connects a local bus which is an interface of an external device with the program control register, and allows access to the program control register from the external device,
    wherein the digital signal processor is adapted to be used as a coprocessor of the external device.

11. A digital signal processor comprising:
    a logical operation circuit;
    a product-sum circuit;
    a plurality of registers;
    a interface unit including a terminal for designating an arbitrary register address and a terminal for reading and writing data for the register designated by the address,
    wherein the digital processor is connectable to another digital processing having the same construction through the interface unit.

12. A digital signal processor which operation on digital signals is controlled by an external device via an instruction memory and a data memory of the external device, comprising:
    a logical operation circuit;
    a product-sum circuit;
    a register;
    a program control register including a program counter, an interrupt vector, a loop start address register and loop end address register; and
    an interface unit between the external device and the program control register for providing access to the program control register by the external device, said interface connecting a local bus,
    wherein the digital signal processor is adapted to be used as a co-processor of the external device.

13. The digital signal processor of claim 12, wherein the external device changes an initial value of the loop start address register or an initial value of the program counter to change an operation in the digital signal processor.

14. A digital signal processor which operation on digital signals is controlled by an external device via an instruction memory and a data memory of the external device, comprising:
    a logical operation circuit;
    a product-sum circuit;
    a plurality of registers;
    an interface unit having a terminal for receiving from the external device a sign for designating an arbitrary register address for one of the registers and a terminal for reading data from and writing data into said one of the registers designated with the arbitrary register address,
    wherein the digital signal processor is selectively connected to another digital signal processor having the same construction through the interface unit.

15. A digital signal processor of claim 14, wherein different coefficient addresses are assigned to each of the digital signal processors to interconnect therebetween for an coordinated operation.

* * * * *